United States Patent
Ellis et al.

(10) Patent No.: US 11,486,266 B2
(45) Date of Patent: Nov. 1, 2022

(54) TURBOMACHINERY HEAT MANAGEMENT SYSTEM

(71) Applicant: General Electric Company, Schenectady, NY (US)

(72) Inventors: Scott Ellis, Greenville, SC (US); David M. Johnson, Greenville, SC (US); Gregory Tempel, Greenville, SC (US); Brett Klingler, Greenville, SC (US); Kenneth Blank, Greenville, SC (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 16/459,609

(22) Filed: Jul. 2, 2019

(65) Prior Publication Data
US 2021/0003033 A1    Jan. 7, 2021

(51) Int. Cl.
| F01D 21/12 | (2006.01) |
| F01D 25/08 | (2006.01) |
| F02C 7/12 | (2006.01) |
| F01D 15/10 | (2006.01) |

(52) U.S. Cl.
CPC .............. *F01D 21/12* (2013.01); *F01D 15/10* (2013.01); *F01D 25/08* (2013.01); *F02C 7/12* (2013.01); *F05D 2270/3032* (2013.01)

(58) Field of Classification Search
CPC .......... F01D 25/08; F01D 25/10; F01D 25/12; F01D 25/14; F01D 21/12; F01D 21/00; F01D 11/20; F01D 11/24; F05D 2270/3032; F02C 7/12; F02C 7/125
See application file for complete search history.

(56) References Cited

U.S. PATENT DOCUMENTS

| 4,482,293 | A | 11/1984 | Perry |
| 5,131,230 | A | 7/1992 | Barton et al. |
| 7,837,429 | B2 * | 11/2010 | Zhang ..................... F01D 11/24 |
| | | | 415/1 |
| 9,494,081 | B2 * | 11/2016 | Laurello .................. F02C 7/18 |
| 9,708,980 | B2 | 7/2017 | Farley et al. |
| 9,988,928 | B2 * | 6/2018 | Popescu ................. F01D 25/12 |
| 10,018,120 | B2 * | 7/2018 | Schwarz ................... F01D 5/08 |

(Continued)

FOREIGN PATENT DOCUMENTS

| EP | 2754859 A1 | 7/2014 |
| EP | 3012415 B1 | 4/2016 |

(Continued)

OTHER PUBLICATIONS

European Patent Office, Extended EP Search Report for corresponding EP Application No. 21168681.1, dated Sep. 22, 2021.

*Primary Examiner* — Alain Chau
(74) *Attorney, Agent, or Firm* — Fletcher Yoder, P.C.

(57) ABSTRACT

A system is provided, including a heat management system. The heat management system includes a thermal delivery system configured to providing heating, cooling, or a combination thereof, to a first zone of a turbomachinery, and a controller operatively coupled to the thermal delivery system and configured to control the heating, the cooling, or the combination thereof, of the first zone, to minimize or to eliminate positional changes, structural changes, or a combination thereof, in one or more components of the turbomachinery due to thermal energy.

10 Claims, 8 Drawing Sheets

(56) References Cited

U.S. PATENT DOCUMENTS

| | | | |
|---|---|---|---|
| 10,100,669 B2* | 10/2018 | Farkas | F01D 5/18 |
| 10,100,699 B2 | 10/2018 | Farkas et al. | |
| 10,760,444 B2 | 9/2020 | Terwilliger et al. | |
| 10,920,592 B2 | 2/2021 | Friedman et al. | |
| 2010/0034635 A1* | 2/2010 | Erickson | F01D 11/24 |
| | | | 415/1 |
| 2010/0237723 A1* | 9/2010 | Gerstler | H02K 3/24 |
| | | | 310/59 |
| 2010/0260598 A1* | 10/2010 | Kirby | F01D 11/24 |
| | | | 415/177 |
| 2013/0251500 A1 | 9/2013 | Cheung et al. | |
| 2014/0193237 A1* | 7/2014 | Reiter | F01D 25/26 |
| | | | 415/1 |
| 2014/0331637 A1* | 11/2014 | Laurello | F01D 25/14 |
| | | | 60/39.5 |
| 2015/0354454 A1 | 12/2015 | Farley | |
| 2016/0091397 A1* | 3/2016 | Shinkle | G05B 23/0232 |
| | | | 702/35 |
| 2016/0108756 A1* | 4/2016 | Farkas | F01D 5/18 |
| | | | 415/1 |
| 2016/0208712 A1* | 7/2016 | Schwarz | F02C 9/18 |
| 2016/0305281 A1* | 10/2016 | Ballard, Jr. | F02C 3/067 |
| 2017/0002683 A1* | 1/2017 | Geveci | F01D 19/02 |
| 2017/0268379 A1 | 9/2017 | Magee et al. | |
| 2017/0268429 A1* | 9/2017 | Kapadia | F02C 7/18 |
| 2017/0335714 A1* | 11/2017 | Popescu | F01D 19/02 |
| 2019/0284954 A1* | 9/2019 | Doesburg | F04D 15/0066 |

FOREIGN PATENT DOCUMENTS

| | | |
|---|---|---|
| EP | 2952691 A1 | 7/2017 |
| EP | 3569824 B1 | 11/2019 |

* cited by examiner

TURBOMACHINERY HEAT MANAGEMENT SYSTEM

BACKGROUND OF THE INVENTION

The subject matter disclosed herein relates to heat management systems, and more specifically to heat management systems in turbomachinery.

Turbomachinery, such as gas turbine systems, may provide for the generation of power. For example, the gas turbine systems typically include a compressor for compressing a working fluid, such as air, a combustor for combusting the compressed working fluid with fuel, and a turbine for turning the combusted fluid into a rotative power. For example, the compressed air is injected into a combustor, which heats the fluid causing it to expand, and the expanded fluid is forced through the gas turbine. The gas turbine may then convert the expanded fluid into rotative power, for example, by a series of blade stages. The rotative power may then be used to drive a load, which may include an electrical generator producing electrical power and electrically coupled to a power distribution grid. Turbomachinery may generate heat during operations. It may be useful to improve heat management of turbomachinery.

BRIEF DESCRIPTION OF THE INVENTION

Certain embodiments commensurate in scope with the originally claimed subject matter are summarized below. These embodiments are not intended to limit the scope of the claimed invention, but rather these embodiments are intended only to provide a brief summary of possible forms of the subject matter. Indeed, the invention may encompass a variety of forms that may be similar to or different from the embodiments set forth below.

In a first embodiment, system is provided, including a heat management system. The heat management system includes a thermal delivery system configured to providing heating, cooling, or a combination thereof, to a first zone of a turbomachinery, and a controller operatively coupled to the thermal delivery system and configured to control the heating, the cooling, or the combination thereof, of the first zone, to minimize or to eliminate positional changes, structural changes, or a combination thereof, in one or more components of the turbomachinery due to thermal energy.

In a second embodiment, a method includes providing heating, cooling, or a combination thereof, to a first zone of a turbomachinery via a thermal delivery system, and controlling the heating, the cooling, or the combination thereof, of the first zone, via a controller, to minimize or to eliminate positional changes, structural changes, or a combination thereof, in one or more components of the turbomachinery due to thermal energy.

In a third embodiment, non-transitory computer readable medium include executable instructions which, when executed by a processor, cause the processor to provide heating, cooling, or a combination thereof, to a first zone of a turbomachinery via a thermal delivery system; and to control the heating, the cooling, or the combination thereof, of the first zone, via a controller, to minimize or to eliminate positional changes, structural changes, or a combination thereof, in one or more components of the turbomachinery due to thermal energy.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 2 is a cross-sectional side view of an embodiment of the gas turbine engine of FIG. 1, illustrating stages of blades and vanes of the multi-stage axial compressor;

FIG. 3 is side view of an embodiment of an airfoil of a compressor rotor blade or a compressor stator vane;

DETAILED DESCRIPTION OF THE INVENTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments include a heat management system that may be used during by a variety of turbomachinery. For example, a gas turbine system may include a heat management system that may provide heat and/or cooling to certain components, e.g., casings or shells of compressors, combustors, turbines, and so on, during certain operations, such as shutdown operations. For example, during shutdown operations, a lower shell of the gas turbine system may cool faster than an upper shell, which may lead expansion/contractions of certain components, and consequent distortions of a rotor. The heat management system may provide heating and/or cooling to compensate for thermal differences, thus improving operations of the turbomachinery. In some embodiments, the heat management system may include a controller communicatively coupled to one or more sensors, such as thermocouples, disposed in various portions the turbomachinery (e.g., gas turbine system). The controller may be operatively coupled to one or more heating and/or cooling systems disposed in the turbomachinery.

The controller may use zone control to control heat and/or cooling of one or more zones in the turbomachinery. In one embodiment, the zone control may include double redundant application of heat/cooling and/or double redundant sensing. For example, a first zone adjacent to a second zone may provide for heating and/or cooling redundancy to the second zone should the second zone develop maintenance issues. Likewise, a first sensor disposed in a first zone, area, or subsystem of the turbomachinery may provide redundancy for a second sensor disposed in a second zone, area, or subsystem. For example, the first sensor may be disposed in a first subsystem and the second sensor may be disposed in a second subsystem, but by using the techniques described herein, the first sensor may provide for data useful in determining conditions of the second subsystem should the second sensor become inoperative. By providing for heating systems with double redundant application of heat/cooling and/or double redundant sensing, the techniques described herein may increase operational life and efficiency of turbomachinery.

Figure 1:
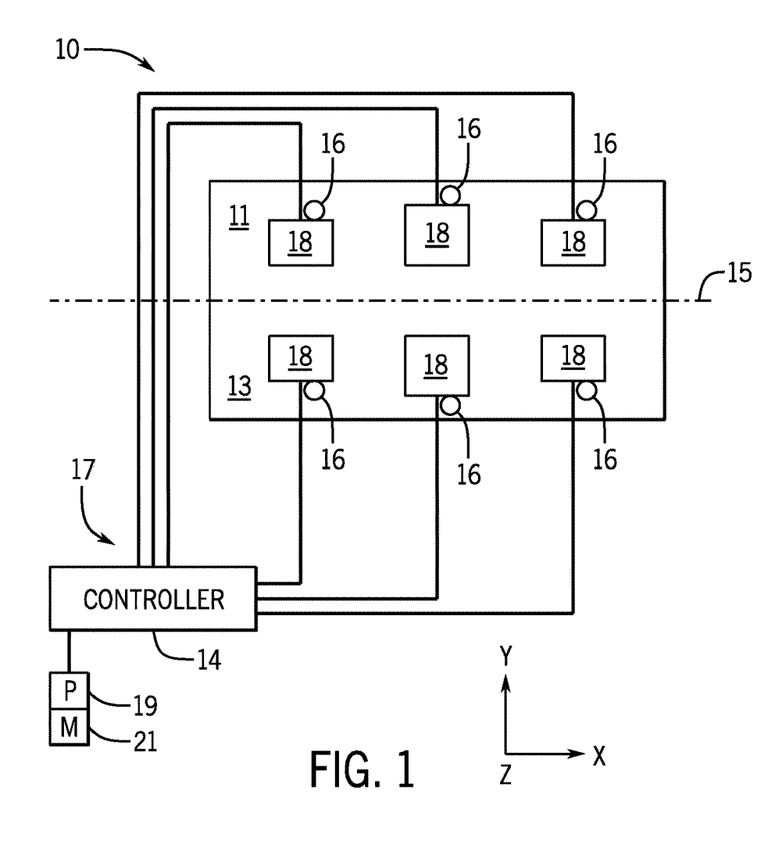
FIG. 1 is a block diagram side view of an embodiment of a turbomachine having a thermal management system.

Turning now to FIG. 1, the figure is a block diagram side view of a turbomachinery 10 having a top shell 11 and a bottom shell 13. A plane 15 divides the top shell 11 from the bottom shell 13. While the turbomachinery 10 is described below with respect to a gas turbine system, the turbomachinery 10 may be any type of turbomachinery, such as a turboexpander, a compressor, a rotary pump, a wind turbine, a hydroelectric turbine, and so on. In the depicted embodiment, a heat management system 17 is also shown. The heat management system 17 may include a control system 14, sensors 16, and thermal delivery systems 18. The sensors 16 may be communicatively coupled to the control system 14 and transmit signals representative, of, for example, temperature. Accordingly, the sensors 16 may include thermocouples, infrared sensors, thermistors, and the like. In certain embodiments, the sensors 16 may be disposed to provide signals representative of temperatures in various zones of the shells 11 and/or 13. Additionally, the sensors 16 may be sensors used by other systems of the turbomachinery 10. For example, sensors used for creep detection, clearance measures, stress measures, and so on.

The control system 14 may be operatively coupled to the thermal delivery systems 18 to provide for heating and/or cooling of certain zones within the turbomachinery 10, such as locations on the top shell 11 and the bottom shell 13. The thermal delivery systems 18 may include heating blankets (e.g., electrically heated blankets), heat exchangers (e.g., fluid based heat exchangers), refrigeration systems, radiative heat systems, and so on, suitable for generating heat and/or removing heat. In use, the turbomachinery 10 may experience heat gradients. For example, when the turbomachinery 10 is a gas turbine system, the bottom shell 13 may be cooling faster than the top shell 11 during shutdown. That is, as heat rises, the bottom shell 13 may be at a lower temperature compared to the top shell 11, which may result in unwanted effects. For example, the bottom shell 13 may contract while the top shell 11 may expand, which may result in a rotor (e.g., rotor disposed to turn axially between the two shells 11, 13) to bend. The controller 14 may received a plurality of signals from the sensors 16 representative of the temperature at each sensor 16 and apply certain heating and/or cooling via the thermal delivery systems 18 as described in more detail below to minimize or eliminate certain heat-related effects, such as rotor bends. Accordingly the controller 14 may include one or more processors 19 and memory 21. The memory 21 may store computer code or instructions executable by the processor(s) 19.

Figure 2:
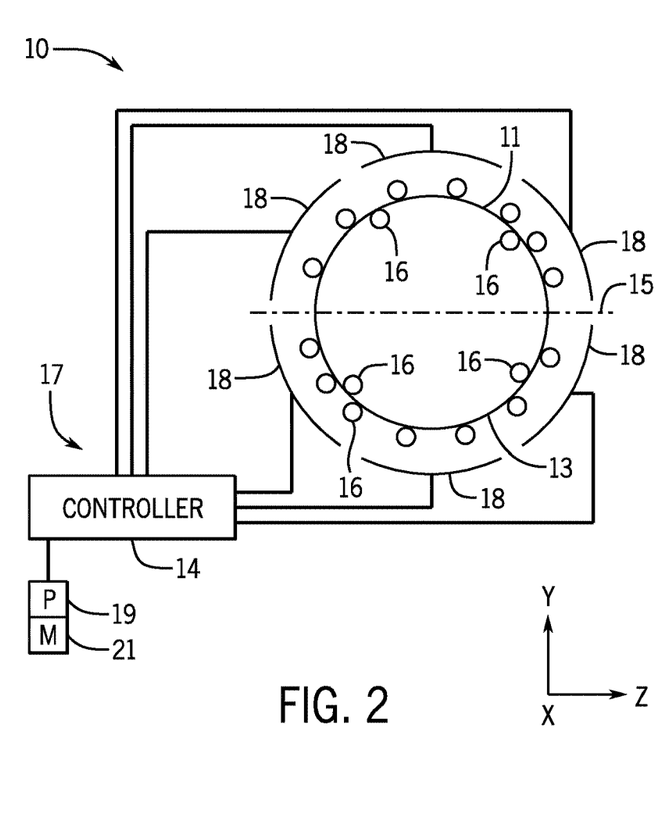
FIG. 2 is a block diagram side view of an embodiment of a turbomachine having a thermal management system.

FIG. 2 is a block side view of an embodiment of the turbomachinery 10 illustrating sensors 16 being places on various locations of the turbomachinery 10. Because the figure like elements to FIG. 1, the figure illustrates the like elements with like numbers. The figure further depicts the sensors 16 disposed on the top shell 11, on the bottom shell 13, as well as in a variety of locations of the turbomachinery 10. In some embodiments, the sensors 16 may be used for additional to or alternative to the heat management system 17. For example, when the turbomachinery 10 is a gas turbine system, some of the sensors 16 may be used to provide for temperature and/or other measurements during operations of the turbomachinery 10. For example, the sensors 16 may include wheel space thermocouples, exhaust gas temperature thermocouples, compressor discharge temperature thermocouples, combustion temperature thermocouples, and so on. Additionally or alternatively, sensors that measure clearance (e.g., rotor clearance, clearance between two or more components), may be used.

The thermal delivery systems 18 may also be disposed on various locations of the turbomachinery 10. In one embodiment, the thermal delivery systems 18 may be disposed on the bottom shell 13 and used to heat the bottom shell 13 to provide for more equal heating of the top shell 11 and the bottom shell 13. That is, by heating the bottom shell 13 at one or more zones, the bottom shell 13 zones may be kept at similar temperatures to areas of the top shell 11 that would have experienced more heat without the techniques described herein. By maintaining less (or no) temperature differences, the turbomachinery 10 may, for example, go through a shutdown cycle with minimal or no rotor bend and clearance changes.

In other embodiments, thermal delivery systems 18 may be disposed both on the bottom shell 13 as well as the top shell 11. In these embodiments, the thermal delivery systems 18 on the top shell 11 may provide for cooling, such as via heat exchangers (e.g., system with conduits that move a cooling fluid into a zone and leave with a heated fluid, thus extracting heat). By combining heating on the bottom shell 13 with cooling on the top shell 11, certain operations, such as turbine shutdown operations, may be improved while increasing the lifecycle of equipment. In yet other embodiments, the thermal delivery systems 18 may provide both heating and cooling, for example by circulating a heated fluid and a cooling fluid based on an amount of heat to be added or to be extracted. The thermal delivery systems 18 may be disposed on the shells 11, 13, or in any location of the turbomachinery 10 that would benefit from heat and/or cooling during certain operations. Indeed, the thermal delivery systems 18 may be disposed in various subsystems of the turbomachinery 10 and operatively coupled to the controller 14. The thermal delivery systems 18 may include electrically heated "blankets", heat exchangers, heat recuperators, radiative heaters, and so on.

It may be beneficial to describe an embodiment where the turbomachinery is a gas turbine system. Accordingly and turning now to FIG. 3, the figure is a block diagram of an embodiment of the turbomachinery 1—as a turbine system 10 that may include a gas turbine engine 12 and the heat management system 17. The controller 14 is shown as communicatively coupled to the variety of sensors 16 and thermal delivery systems 18 disposed in various components of the gas turbine engine 12. Signals received via the sensors 16 may be used to derive thermal actions executable via the thermal delivery systems 18. The illustrated gas turbine engine 12 includes a compressor 20 (e.g., a multi-stage axial compressor or compressor section), a turbine 22 (e.g., a multi-stage turbine or turbine section), and fuel nozzles 24 coupled to one or more combustors 26 (e.g., compressor section). The compressor 20 and turbine 22 each may have any number of rows stages of rotor blades and stator vanes (e.g., 1 to 20).

Figure 3:
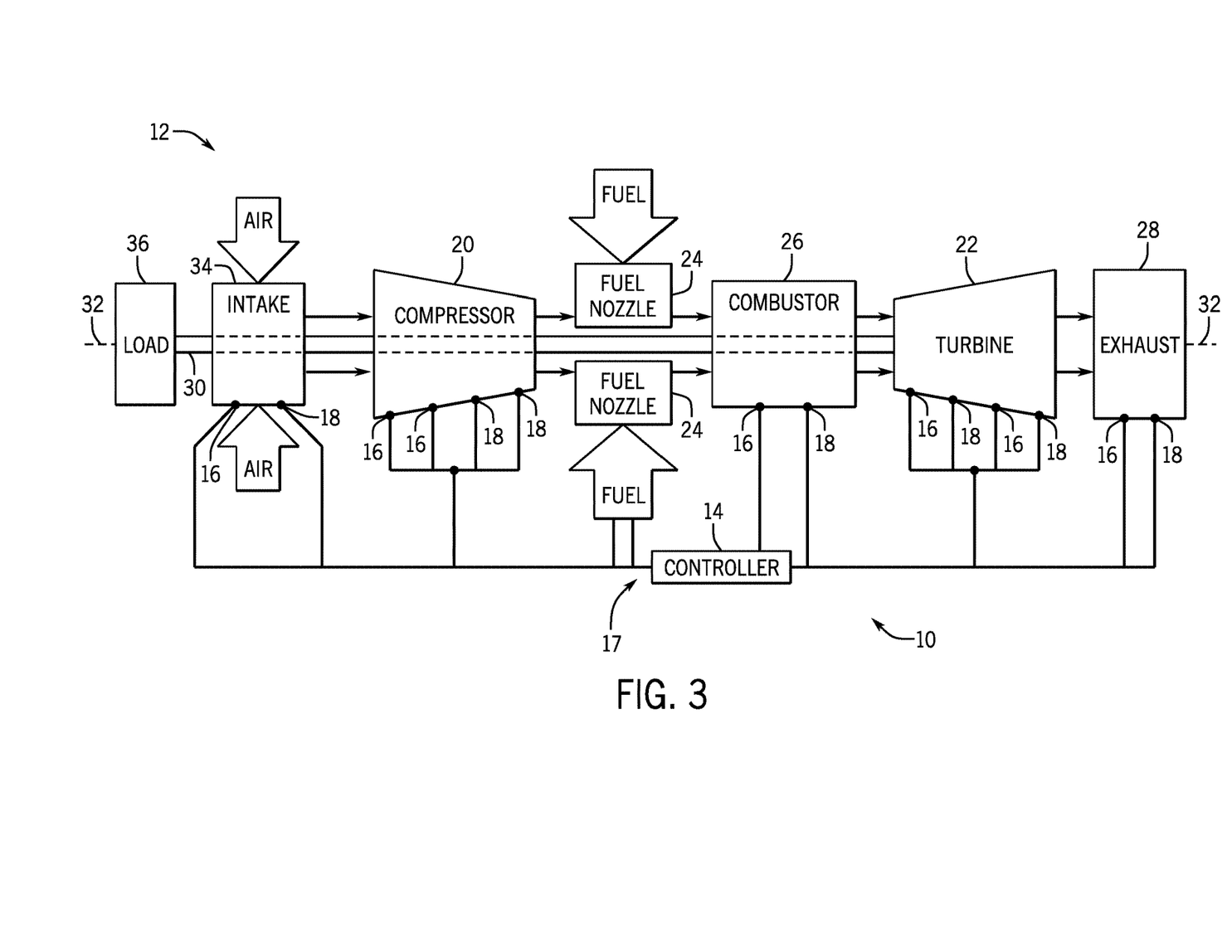
FIG. 3 is a block diagram of an embodiment of a gas turbine system having a multi-stage axial compressor.

In operation, the compressor 20 is configured to compress a compressible fluid (e.g., gas such as air, oxygen, and/or exhaust gas), and deliver the compressed fluid to the fuel nozzles 24 and/or combustors 26. Although the compressible fluid may include any suitable gas, the following discussion may generally refer to the compressible fluid as an oxidant (e.g., air) as one non-limiting example. The fuel nozzles 24 are configured to supply fuel (e.g., from one or more fuel supplies) into the one or more combustors 26 (e.g., in combustion chambers), which combust the fuel with the oxidant (e.g., air) to generate hot combustion gases to drive the turbine 22. The fuel nozzles 24 may be designed as pre-mix fuel nozzles 24 and/or diffusion fuel nozzles 24. Pre-mix fuel nozzles 24 mix the fuel with the oxidant (e.g., air) to create pre-mix type flames. Diffusion fuel nozzles 24 do not premix the fuel with the oxidant, and thus create diffusion type flames. Regardless of the type of flames, the hot combustion gas flows from the combustors 26 into the turbine 22, thereby driving rotation of one or more stages of turbine blades coupled to a turbine rotor and shaft 30 along an axis 32. Eventually, the hot combustion gas exits the turbine 22 through an exhaust outlet 28 (e.g., exhaust stack, exhaust end). In the illustrated embodiment, the shaft 30 is coupled to the compressor 20 and a load 36, such that rotation of the shaft 30 also drives rotation of the compressor 20 and the load 36. The compressor 20 may intake the oxidant (e.g., air) through an air intake 34, which may include filters, thermal control systems, or any other pre-conditioning systems. The load 36 may include an electrical generator, a rotary machine, a propulsion system of a vehicle, or any other suitable device.

Figure 4:
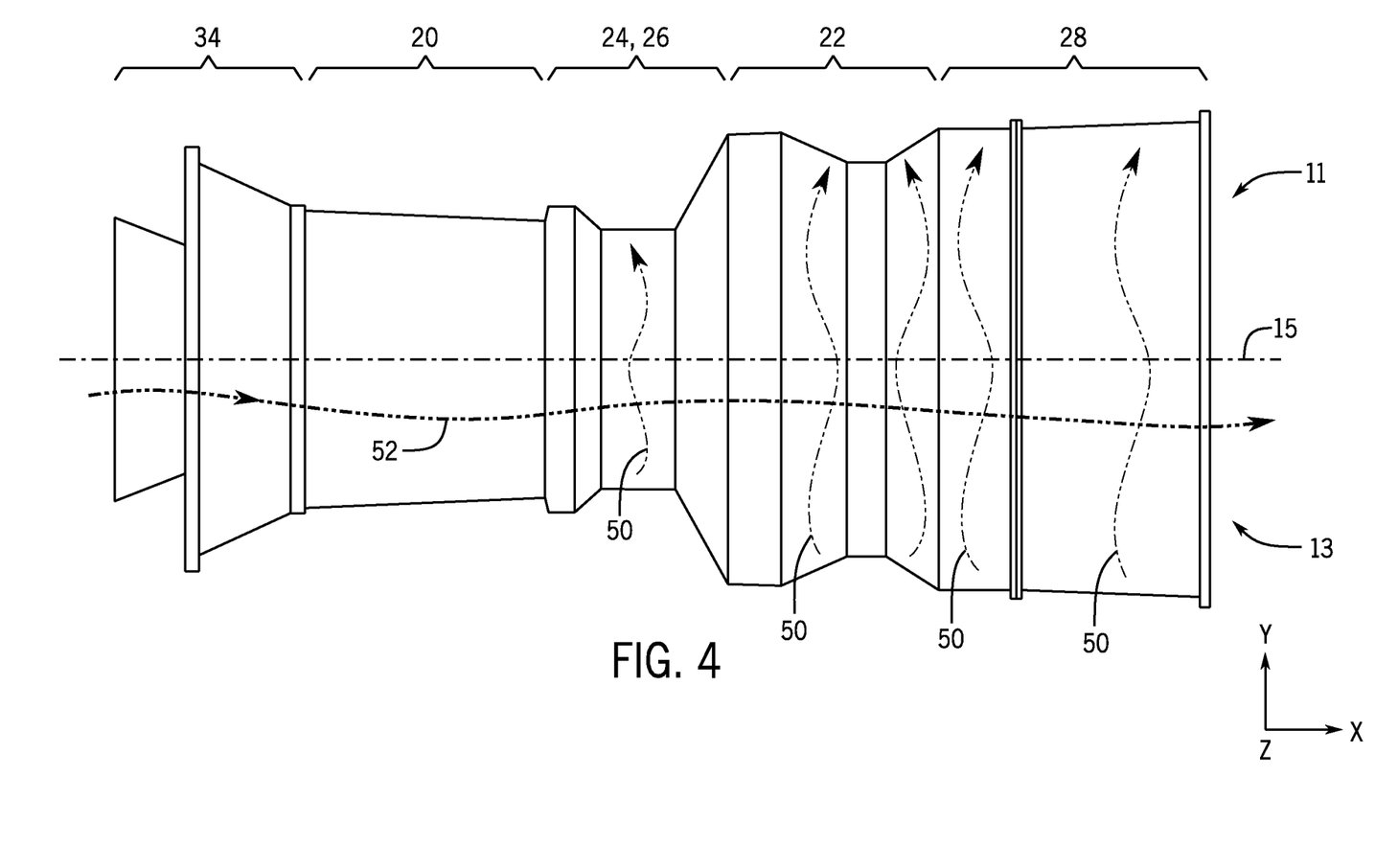
FIG. 4 is a side view of and embodiment of the gas turbine engine showing internal plumes of hot air.

During shutdown, heat in the bottom shell 13 may rise to the top shell 11, as shown in FIG. 4. More specifically the figure is a side view of and embodiment of the gas turbine engine 12 showing internal plumes of hot air 50 flowing from the lower shells 13 upwards towards the top shells 11, for example, during shutdown operations Immediately after shutdown, the lower shells 13 may be at about the same temperature when compared to the upper shells 11, and a flow of air 52 (e.g., stack draft flow) may enter the gas turbine engine 12 through the intake section 34, move through the compressor section 30, the nozzles/combustor sections 24, 26, the turbine section 22, and exit through the exhaust section 28. As time increases, heat may be transferred from the lower shells 13 into the upper shells 11 via the internal plumes of hot air 50.

Figure 5:
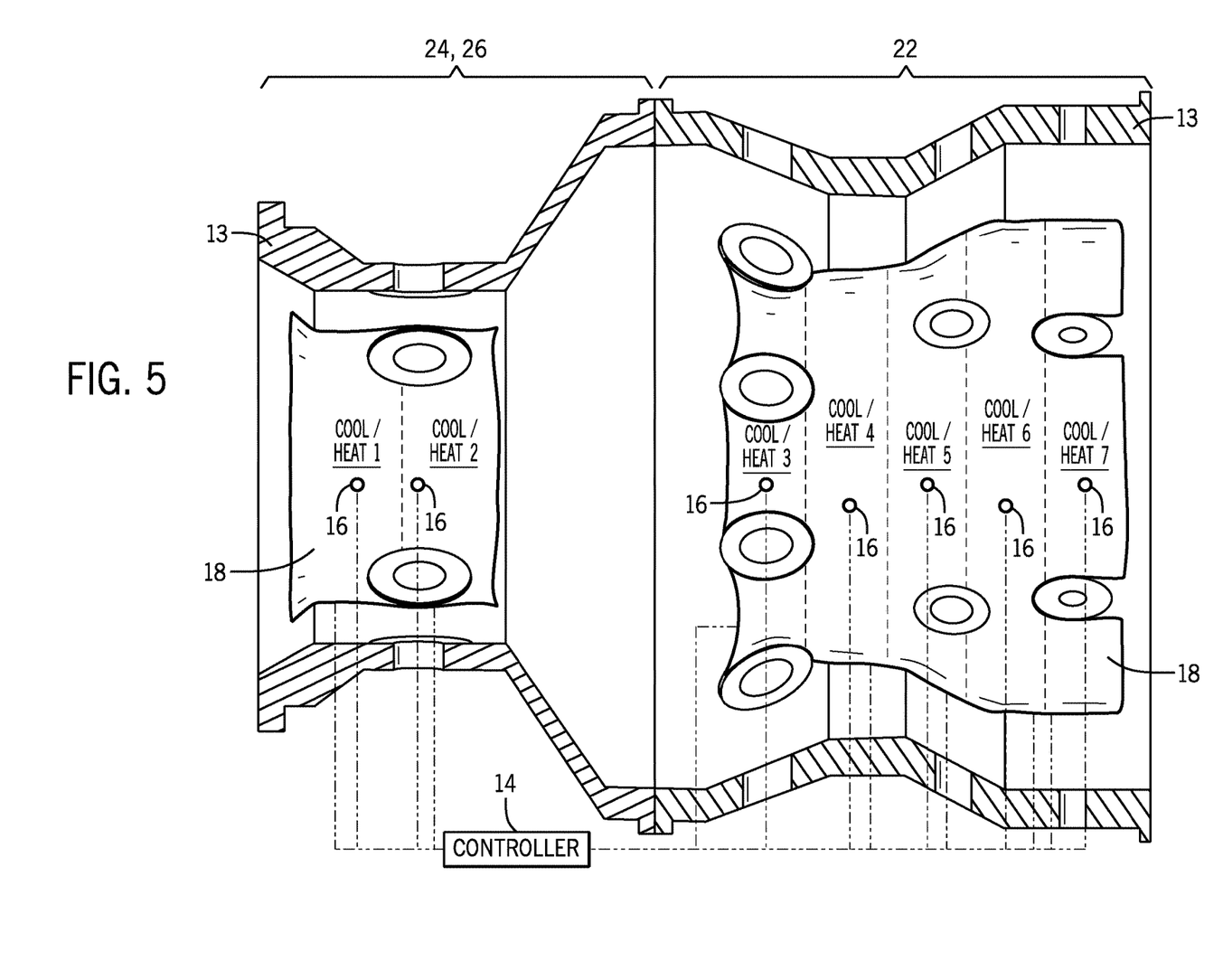
FIG. 5 is a schematic view of embodiments of two thermal delivery systems that may be disposed on bottom sections of shells of turbomachinery.

It would be beneficial to heat the lower shells 13 and/or cool the upper shells 11 to maintain more equal temperatures. Accordingly, the heat management system 17 may apply heat and/or remove heat from certain zones, as illustrated in FIG. 5. More specifically, FIG. 5 is a schematic view of embodiments of two thermal delivery systems 18 that may be disposed on bottom sections of shells 13. The thermal delivery system 18 disposed on the shell 13 of the nozzle\combustor sections 24, 26 includes one heating and/or cooling zone composed of two heating/cooling units 1, 2. The thermal delivery system 18 disposed on the shell 13 of the turbine section 22 includes two heating and/or cooling zones, a first zone composed of heating/cooling unit 3, and a second zone composed of heating/cooling units 4, 5, 6, and 7. Indeed, a zone may include one or more subzones, each subzone corresponding to a heating/cooling unit.

Zones and subzones may be selected for heating and/or cooling based on, for example, thermal studies that analyze the materials, thicknesses, manufacturing data, and/or geometries of the shells (e.g., shells 11, 13), subsystems (e.g., rotor 30, components of the intake section 34, compressor section 20, fuel nozzles 24, combustor 26, turbine 22, exhaust 28, and so on) to determine or otherwise model heat flows through the gas turbine engine 12. The heat flows may then be used to determine zone and subzones for heating and/or cooling. The heat flows may also be used to determine heating schedules for heating and/or cooling zones and/or subzones. For heating purposes, each heating/cooling unit may include an axial heating "strip" that may use electrical heating. Other heating embodiments may include heat exchangers, heat recuperators, radiative heaters, microwave heating elements, and so on. For cooling purposes, heat exchanges, refrigeration systems, and so on, may be used.

In certain embodiments, each subzone (or zone having a single subzone) may be independently controlled by the controller 14. That is, the heating and/or cooling schedule may be provided for each subzone (or zone having a single subzone) that may be different for other subzones. In some embodiments, some subzones (e.g., adjacent subzones) may follow the same heating and/or cooling schedule. The heating and/or cooling schedule may be used to determine how much heating and/or cooling to apply at a given point in time (e.g., time following the start of shutdown).

Zones and/or subzones may also be used to provide redundant operations. For example, should a heating/cooling unit experience operating issues, adjacent heating/cooling units may enter into a redundancy mode where the adjacent heating/cooling units may provided added heating or cooling to compensate for the loss of heating or cooling of the heating/cooling unit experiencing the issue. In some embodiments, redundancy mode heating and/or cooling schedules may be provided, that may have been derived based on thermal analysis of a zone and/or subzone experiencing heating/cooling unit issues (e.g., failure of the heating/cooling unit). That is, a redundancy mode heating and/or cooling schedule may be derived that increases heating and/or cooling for a given working zone and/or subzone based on issues experienced by adjacent zones and/or subzones. Accordingly, the controller 14 may switch from normal operations to redundant operations, for example, by switching to using redundancy mode heating and/or cooling schedule(s).

Figure 6:
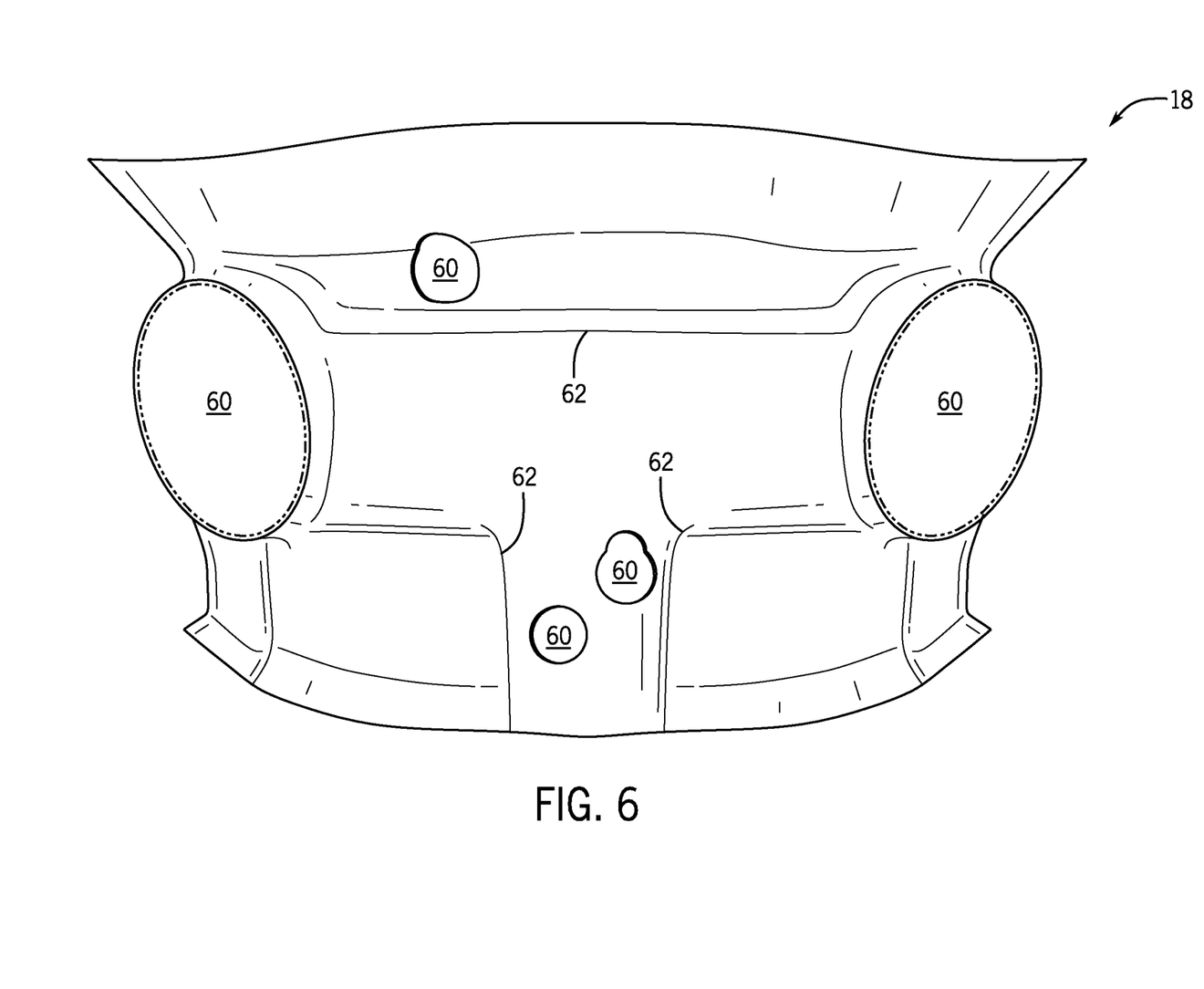
FIG. 6 is a perspective view depicting a heat blanket embodiment of one of the thermal delivery systems.

FIG. 6 is a perspective view depicting a heat blanket embodiment of one of the thermal delivery systems 18 illustrating the use of contouring and shape design to more comfortably fit the thermal delivery system 18 onto, for example, an external portion of a shell such as the shell 11 or 13. In the depicted embodiment, cutouts 60 may provide for areas to enable certain components (e.g., protruding nozzles, machinery inspection ports) to be accessed. Contours 62 may comfortably follow underlying geometries of the shells so as to improve fit (e.g., improve coverage by more closely following a variety of part geometries) and thus provide for enhanced heating.

In some embodiments, the thermal delivery systems 18 may be added after installation of the turbomachinery 10. For example, the thermal delivery systems 18 may be provided as an after-install kit or as an upgrade kit and installed in situ. For example, the depicted heating blanket embodiment of the thermal delivery system 18 may be placed on exterior walls of shells and secured via fasteners such as straps, nuts and bolts, welds, adhesives, and so on. Sensors 16 conduits and conduits used to operate heating elements may then be connected to the controller 14. For example, the various conduits that may be used are described in FIG. 7 below.

Figure 7:
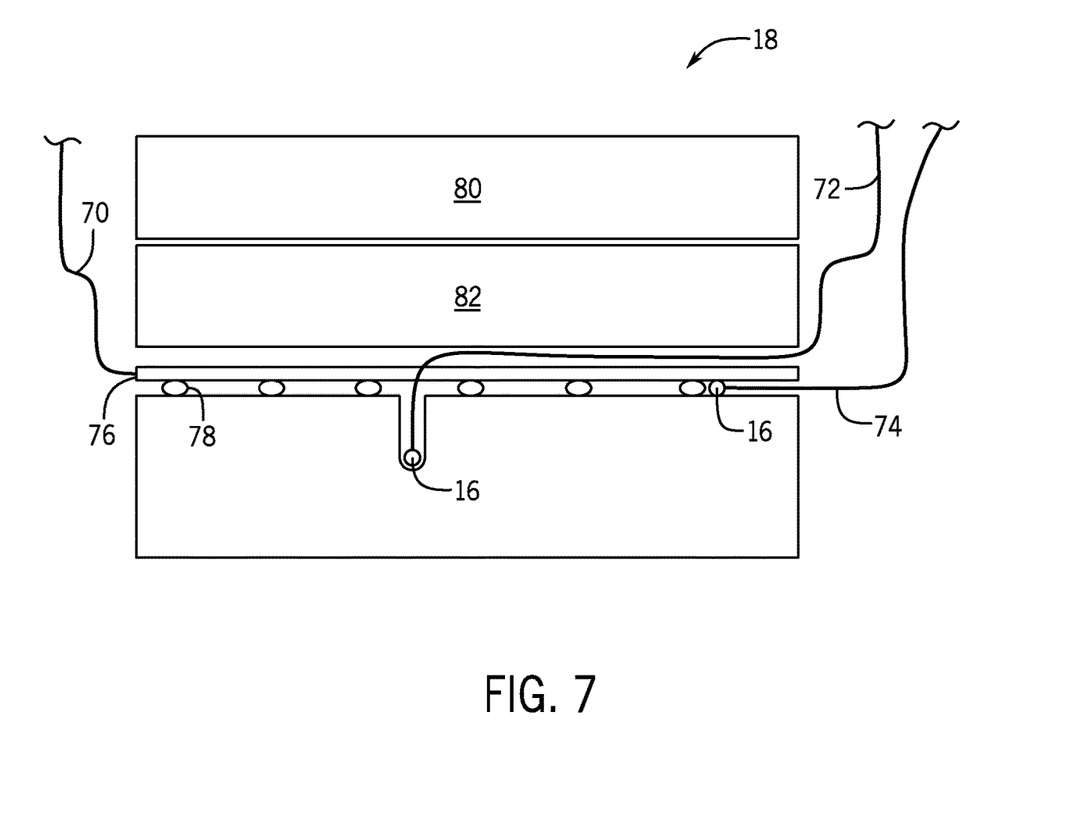
FIG. 7 a front view of a block diagram depicting embodiments of conduits useful in operatively and communicatively coupling an embodiment of a thermal delivery system to a controller.

FIG. 7 is a front view of a block diagram depicting embodiments of conduits 70, 72, and 74 useful in operatively and communicatively coupling an embodiment (e.g., heat blanket embodiment) of the thermal delivery system 18 to the controller 14. In the depicted embodiment, conduit 70 may be used to operate a heating blanket 76. For example, sending electric power through the conduit 70 may heat heating elements 78 included in the heating blanket 76. Insulation layers 80 and 82 may use to retain the heat being added.

In use, the controller 14 may receive signals from the sensor 16 representative of temperature in a zone of a shell (e.g., shown in as embedded in a section of the bottom shell 13). Accordingly, the controller 14 may adjust electric power through the conduit 70 to raise or lower the heat provided by the thermal delivery system 18. While two insulation layers 80 and 82 are shown, one, three, four, or more layers may be used. A sensor 16 is also shown, used to sense temperatures being delivered via the heating blanket 76, for example, to protect from overheating of the heating blanket 76 itself. It is to be understood that the heating blanket show is but one embodiment of the thermal delivery system 18, and other embodiments may include heat exchangers and the like, suitable for adding heat to a zone.

Figure 8:
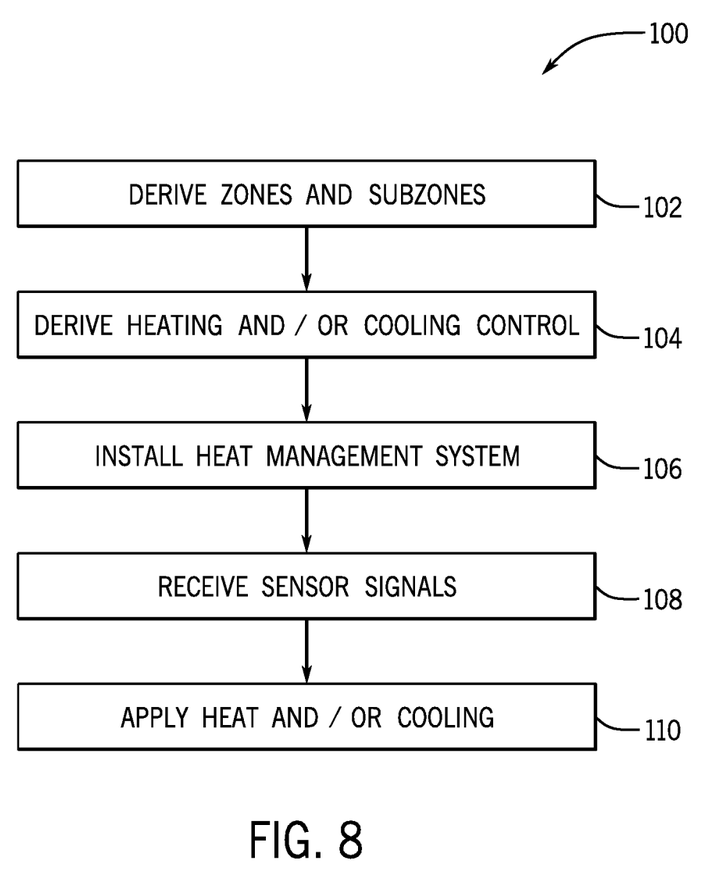
FIG. 8 is a flowchart of an embodiment of a process suitable for implementing independent zone-based temperature control with fault tolerant heating and/or sensing.

Turning now to FIG. 8, the figure is a flowchart of an embodiment of a process 100 suitable for implementing the techniques described herein. The process 100 or portions of the process 100 may be implemented as computer code or instructions executable via the processor(s) 19 and stored in the memory 21. In the depicted embodiment, the process 100 may derive (block 102) one or more zones and/or subzones to be used for heating and/or for cooling of the turbomachinery 10. For example, thermodynamic analysis of heat flows following shutdown of the gas turbine engine 12 may be used to derive (block 102) one or more zones and/or subzones for use in heating and/or cooling.

The process 100 may then derive (block 104) logic or control algorithms suitable for applying heating and/or cooling to each zone and/or subzone. In one embodiment, temperature differential control may be used for each zone and/or subzone. That is, the derivation (block 104) may result in a logic that uses temperature differences between sensors 16 disposed in a lower portion of the bottom shell 13 and sensors 18 disposed in an upper portion of the upper shell 11 may be read to determine a temperature difference between the lower portion of the shell 13 and the upper portion of the shell 11 in each zone and/or subzone. One or more temperature difference setpoints may then be derived (block 104). In certain embodiments, the temperature difference setpoints may be derived to result in a heating and/or cooling schedule. That is, for a given time t after shutdown, the heating and/or cooling schedule may then provide a temperature difference to maintain. The controller 14 may thus use the temperature difference to maintain by adding and/or removing heat via the thermal delivery system 18. For example, thermodynamic analysis of heat flows following shutdown of the gas turbine engine 12 may be used to derive (block 104) the one or more temperature difference setpoints.

Redundant control logic may also be derived (block 104). For example, should a zone and/or subzone stop operating, neighboring zones and/or subzones may switch to a fault or redundant mode where zone fault-based temperature difference setpoints may be used. The zone fault-based temperature difference setpoints may include values designed to compensate for the fault while still providing for heating and/or cooling suitable for continuing operations (e.g., shutdown operations) of the turbomachinery 10. Redundant sensing logic may also be derived (block 104). For example, sensor fault-based temperature difference setpoints may be derived (block 104) that use sensed temperature differences at alternative (e.g., secondary location) sensors 16 should primary sensors 16 not operate as desired. For example, thermodynamic analysis of heat flows following shutdown of the gas turbine engine 12 may be used to derive (block 104) the one or more zone and sensor fault-based temperature difference setpoints.

The process 100 may then install (block 106) the heat management system 17, for example, during manufacture of the turbomachinery 10 or during in situ upgrades of the turbomachinery 10. The thermal delivery systems 18 may be installed and connected to the controller 14, and any additional sensors 16 not already present in the turbomachinery 10 may be installed and connected to the controller 14. Once the heat management system 17 is in place (block 106), the process 100 may proceed with thermal operations.

For example, the process 100 may receive (block 108) signals representative of temperatures at lower (e.g., bottom shell 13) and upper (e.g., upper shell 11) zones/subzones of shells incoming from the sensors 16. The process 100 may then apply (block 110) heating and/or cooling based on the signals. For example, temperature differentials between the upper and lower shell 11, 13 zones and/or subzones may be compared against the temperature difference setpoints. Differences between the temperature difference setpoints and the measured temperature differences may then be used to actuate the thermal delivery systems 18. Should a zone, subzone, and/or sensor 16 become inoperative, the process 100 may still provide (block 110) heating and/or cooling suitable for operations by using the zone and/or the sensor fault-based temperature difference setpoints/logic. Accordingly, the techniques described herein may result in improved turbomachinery operation even in situations where some of the sensors 16 and/or some of thermal delivery systems 18 may experience unwanted issues.

It may be beneficial to describe operations of the heat management system 17. Accordingly and turning now to FIG. 9, the figure is a diagram illustrating a process 200 for operations of one of the thermal delivery systems 18 via the heat management system 17 during shutdown of the gas turbine engine 12. The diagram 100 includes an X axis 202 and a Y axis 104204. The axis 202 illustrates time, while the axis 204 may illustrate various metrics as further described below.

Figure 9:
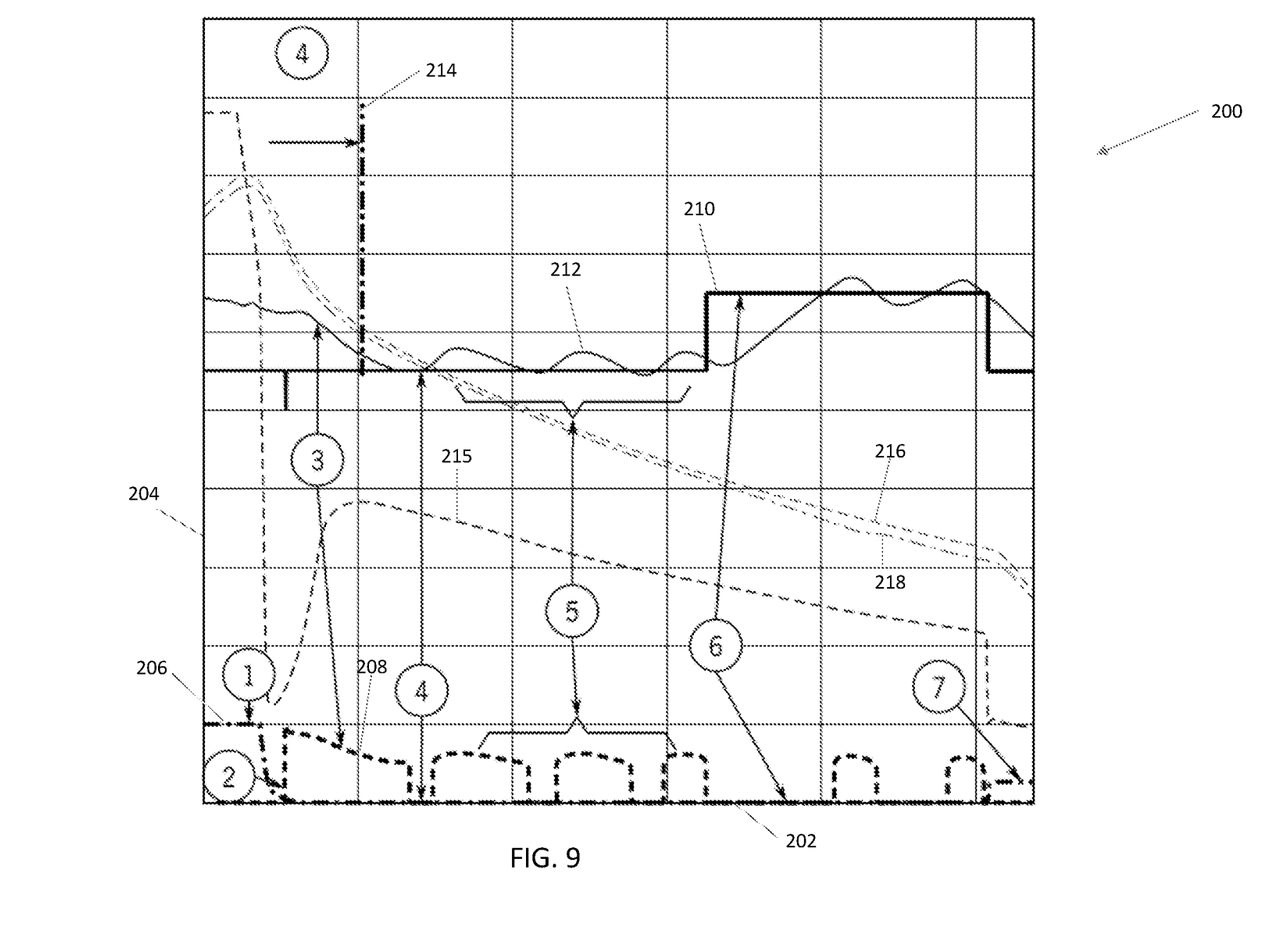
FIG. 9 is a diagram illustrating a process for operations of one of thermal delivery system via a heat management system during shutdown of a gas turbine engine.

In the depicted embodiment, at time 1, a unit shutdown command may be issued. Accordingly, a turbine speed (e.g., speed in RPM) curve 206 illustrates a sharp drop-off as the gas turbine 12 slows down. At time 2, the gas turbine 12 may decelerate to 30% speed or below, and the heat management system 17 may activate one or more of the thermal delivery systems 18. For example, at 30% speed or below, it may be beneficial to initiate heating certain zones of the bottom shell 13 to ameliorate temperature differences between the shells 11 and 13. A electric power 208 may then be transmitted to the thermal delivery system 18 to heat the zone corresponding to the thermal delivery system 18.

At time 3 the process 200 may control to a target temperature difference setpoint curve 210 versus measured temperature difference curve 212. That is, temperature difference control may be used, where a first sensor in a first area of the zone that cools faster (e.g., shell 13) when compared to a second area of the zone that may be heating (e.g., shell 11) may be used to compare against a desired setpoint (e.g., curve 210) and the comparison then used to provide electric power 208. For example, a first sensor 16 may be disposed on the top portion of the shell 11 (sensor that measures heat rising from shell 11) and a second sensor 16 may be disposed on a lower portion of the shell 13 (sensor that measures cooling of the shell 13) and differences in measurements may then be used to control heating of the shell 13. Accordingly, the zone may include adjacent areas of shells 11 and 13 but heat may be provided only to shell 13 and cooling may be provided only to shell 11.

At time 4 (e.g., curve 214), starts permissives may activate. That is, after a certain time (e.g., between 1 minute to 5 hours), start permissives may activate after flameout. Restarts of the gas turbine may be locked out if top-to-bottom temperature differences and wheelspacing permissives are not met. At time 5, the controller may reach the desired target and taper off. At time 6, the controller may continue to modulate power 208 to maintain desired top-bottom temperature differences within the target plus a deadband. At time 7 an EF blower may turn off after flameout, and targets may then change to account for new thermal conditions. Subsequently a cycle may repeat until certain conditions occur, such as wheelspace at less than certain degrees (e.g., 150 degrees) or speed exceeding 30%. Also shown are a compressor discharge temperature curve 215, and sensor readings 216, 218 corresponding to top sensors 16 (e.g., shell 11 sensors) and bottom sensors 16 (shell 13 sensors) respectively.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a heat management system, comprising:
      a thermal delivery system configured to providing heating, cooling, or a combination thereof, to a first zone of a turbomachinery;
      a controller operatively coupled to the thermal delivery system and configured to control the heating, the cooling, or the combination thereof, of the first zone, to minimize or to eliminate positional changes, structural changes, and a combination thereof, in one or more components of the turbomachinery due to thermal energy, wherein the controller is configured to provide for fault tolerance after sensing that the thermal delivery system providing heating, cooling, or combination thereof of the first zone is not operating as desired by adjusting the heating, the cooling, or the combination thereof, of a second zone adjacent to the first zone;
      a first temperature sensor disposed in the first zone, and wherein the controller is communicatively coupled to the first temperature sensor and configured to control the heating, the cooling, or the combination thereof, based on signals from the first temperature sensor; and
      a second temperature sensor disposed in the first zone, and wherein the controller is communicatively coupled to the second temperature sensor and configured to control the heating, the cooling, or the combination thereof, based on deriving a temperature difference between a first temperature measured by the first sensor and a second temperature measured by the second sensor, wherein the controller is configured to provide for fault tolerance for the first sensor or the second sensor by utilizing measurements provided by a third sensor disposed in the second zone of the turbomachinery; and wherein the third sensor is communicatively coupled to a first system of the turbomachinery separate from the thermal delivery system and used during operations of the first system.

2. The system of claim 1, wherein the controller is configured to independently control the heating, the cooling, or the combination thereof, of the first zone from the heating, the cooling, or the combination thereof, of the second zone of the turbomachinery.

3. The system of claim 1, wherein the one or more components comprise a lower shell mechanically coupled to an upper shell of a gas turbine engine, and wherein the controller is configured to control the heating, the cooling, or the combination thereof, by deriving a temperature difference between the lower shell and the upper shell.

4. The system of claim 3, wherein the controller is configured to control the heating, the cooling, or the combination thereof, by comparing the temperature difference between the lower shell and the upper shell to a temperature difference setpoint, and to adjust the heating, the cooling, or the combination thereof, based on the comparison.

5. The system of claim 1, wherein the controller is configured to control operations of the turbomachinery.

6. The system of claim 5, wherein the turbomachinery comprises a gas turbine engine, and wherein the controller is configured to control a shutdown operation.

7. A method, comprising:
   providing heating, cooling, or a combination thereof, to a first zone of a turbomachinery via a thermal delivery system;
   controlling the heating, the cooling, or the combination thereof, of the first zone, via a controller, to minimize or to eliminate positional changes, structural changes, and a combination thereof, in one or more components of the turbomachinery due to thermal energy; and
   providing fault tolerance after sensing that the thermal delivery system providing heating, cooling, or combination thereof of the first zone is not operating as desired by adjusting the heating, the cooling, or the combination thereof, of a second zone adjacent to the first zone via a first temperature sensor, a second temperature sensor, and a third temperature sensor, wherein the first temperature sensor is disposed in the first zone, and wherein the controller is communicatively coupled to the first temperature sensor and configured to control the heating, the cooling, or the combination thereof, based on signals from the first temperature sensor, wherein the second temperature sensor is disposed in the first zone, and wherein the controller is communicatively coupled to the second temperature sensor and configured to control the heating, the cooling, or the combination thereof, based on deriving a temperature difference between a first temperature measured by the first sensor and a second temperature measured by the second sensor, wherein the controller is configured to provide for fault tolerance for the first sensor or the second sensor by utilizing measurements provided by the third sensor disposed in the second zone of the turbomachinery; and wherein the third sensor is communicatively coupled to a first system of the turbomachinery separate from the thermal delivery system and used during operations of the first system.

8. The method of claim 7, comprising controlling heating, cooling or a combination thereof, of the second zone of the turbomachinery, and wherein the heating, cooling, or combination thereof, of the first zone is independently controlled from the heating, cooling, or combination thereof, of the second zone.

9. A non-transitory computer readable medium comprising executable instructions which, when executed by a processor, cause the processor to:

provide heating, cooling, or a combination thereof, to a first zone of a turbomachinery via a thermal delivery system;

control the heating, the cooling, or the combination thereof, of the first zone, via a controller, to minimize or to eliminate positional changes, structural changes, and a combination thereof, in one or more components of the turbomachinery due to thermal energy; and provide fault tolerance after sensing that the thermal delivery system providing heating, cooling, or combination thereof of the first zone is not operating as desired by adjusting the heating, the cooling, or the combination thereof, of a second zone adjacent to the first zone via a first temperature sensor, a second temperature sensor, and a third temperature sensor, wherein the first temperature sensor is disposed in the first zone, and wherein a controller is communicatively coupled to the first temperature sensor and configured to control the heating, the cooling, or the combination thereof, based on signals from the first temperature sensor, wherein the second temperature sensor is disposed in the first zone, and wherein the controller is communicatively coupled to the second temperature sensor and configured to control the heating, the cooling, or the combination thereof, based on deriving a temperature difference between a first temperature measured by the first sensor and a second temperature measured by the second sensor, wherein the controller is configured to provide for fault tolerance for the first sensor or the second sensor by utilizing measurements provided by the third sensor disposed in the second zone of the turbomachinery; and wherein the third sensor is communicatively coupled to a first system of the turbomachinery separate from the thermal delivery system and used during operations of the first system.

10. The computer readable medium of claim 9, comprising instructions that cause the processor to control heating, cooling or a combination thereof, of the second zone of the turbomachinery, and wherein the heating, cooling, or combination thereof, of the first zone is independently controlled from the heating, cooling, or combination thereof, of the second zone.

* * * * *